(12) United States Patent
Gomez Ramirez et al.

(10) Patent No.: US 12,553,520 B2
(45) Date of Patent: Feb. 17, 2026

(54) METAL SEAL FOR DYNAMIC DOWNHOLE ENVIRONMENTS

(71) Applicant: Schlumberger Technology Corporation, Sugar Land, TX (US)

(72) Inventors: David Gomez Ramirez, Rosharon, TX (US); Matthew Hoffmeyer, Sugar Land, TX (US); Chijie Lin, Rosharon, TX (US); Gabriel Alin Isaicu, Missouri City, TX (US); Brad Swenson, Rosharon, TX (US); Karl Wong, Rosharon, TX (US); Hoi Ling Cheng Tu, Houston, TX (US); Travis Hohenberger, Rosharon, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/662,229

(22) Filed: May 13, 2024

(65) Prior Publication Data

US 2025/0347345 A1    Nov. 13, 2025

(51) Int. Cl.
  *F16J 15/3284*    (2016.01)

(52) U.S. Cl.
  CPC ............................... *F16J 15/3284* (2013.01)

(58) Field of Classification Search
  CPC ...... F16J 15/32; F16J 15/3204; F16J 15/3232; F16J 15/3236; F16J 15/3268; F16J 15/3284
  See application file for complete search history.

(56) References Cited

U.S. PATENT DOCUMENTS

| 4,323,287 | A | * | 4/1982 | Stella | F16C 13/006 384/148 |
|---|---|---|---|---|---|
| 5,031,923 | A | | 7/1991 | Davies | |
| 5,044,672 | A | | 9/1991 | Skeels et al. | |
| 5,076,594 | A | | 12/1991 | Baugh | |
| 5,246,236 | A | | 9/1993 | Szarka et al. | |
| 5,364,110 | A | | 11/1994 | Streich et al. | |
| 8,622,142 | B2 | | 1/2014 | Shaw | |
| 8,814,175 | B2 | | 8/2014 | Tohdoh | |
| 8,894,070 | B2 | | 11/2014 | Bhat et al. | |

(Continued)

FOREIGN PATENT DOCUMENTS

| CN | 113544357 A * | 10/2021 | ............. F16J 15/181 |
|---|---|---|---|
| JP | 7611308 B2 * | 1/2025 | ............. F16J 15/181 |

OTHER PUBLICATIONS

Translation of CN113544357 (Year: 2025).*
Translation of JP7611308 (Year: 2025).*

*Primary Examiner* — Gilbert Y Lee
(74) *Attorney, Agent, or Firm* — Jeffrey D. Frantz (57) ABSTRACT

A seal may include a seal body, an inner arm protruding from the seal body and configured to mate with an inner surface, the inner arm including: an inner seal protrusion proximate to a distal end of the inner arm, and an inner support protrusion; and an outer arm protruding from the seal body and configured to mate with an outer surface, the outer arm including: an outer seal protrusion proximate to a distal end of the outer arm, and an outer support protrusion, wherein the inner seal protrusion and outer seal protrusion define a seal width, and the inner support protrusion and outer support protrusion define a support width less than the seal width in an uncompressed state.

19 Claims, 8 Drawing Sheets

(56) References Cited

U.S. PATENT DOCUMENTS

| | | |
|---|---|---|
| 9,611,712 B2 | 4/2017 | Kalinec |
| 10,180,188 B2 | 1/2019 | Pathak |
| 2003/0080516 A1 | 5/2003 | Zheng |
| 2011/0018275 A1 | 1/2011 | Sidenmark |
| 2014/0319783 A1 | 10/2014 | Gomez |
| 2017/0328472 A1* | 11/2017 | LoGiudice et al. ... F16J 15/025 |
| 2023/0047066 A1* | 2/2023 | Barnett ................. F04B 1/0448 |
| 2024/0125209 A1* | 4/2024 | Qin ...................... F16J 15/3284 |

* cited by examiner

METAL SEAL FOR DYNAMIC DOWNHOLE ENVIRONMENTS

BACKGROUND

In a downhole environment, sealing of annular spaces between components exposes the seal to debris and other materials suspended in the fluids present in the volume. This debris can compromise the quality of the seal, particularly when the seal is moved in an axial direction during operations.

SUMMARY

In some aspects, the techniques described herein relate to a seal including: a seal body; an inner arm protruding from the seal body and configured to mate with an inner surface, the inner arm including: an inner seal protrusion proximate to a distal end of the inner arm, and an inner support protrusion; and an outer arm protruding from the seal body and configured to mate with an outer surface, the outer arm including: an outer seal protrusion proximate to a distal end of the outer arm, and an outer support protrusion, wherein the inner seal protrusion and outer seal protrusion define a seal width, and the inner support protrusion and outer support protrusion define a support width less than the seal width in an uncompressed state.

In some aspects, the techniques described herein relate to a sealing system including: a first seal including: a seal body; an inner arm protruding from the seal body and configured to mate with an inner surface, the inner arm including: an inner seal protrusion proximate to a distal end of the inner arm, and an inner support protrusion, and an outer arm protruding from the seal body and configured to mate with an outer surface, the outer arm including: an outer seal protrusion proximate to a distal end of the outer arm, and an outer support protrusion, wherein the inner seal protrusion and outer seal protrusion define a seal width, and the inner support protrusion and outer support protrusion define a support with width; a first support ring proximate to the first seal and configured to axially support the first seal; a second seal positioned in an axial direction opposite the first seal and across the first support ring; and a second support ring proximate to the second seal and configured to axially support the second seal between the second seal and the first support ring.

In some aspects, the techniques described herein relate to a method of providing a fluid seal in a downhole environment, the method including: providing an annular seal in contact with a static surface; moving a dynamic surface radially opposite to the static surface in an axial direction relative to the annular seal; contacting the dynamic surface with a seal protrusion; and deforming an arm of the annular seal based at least partially on the contact of the seal protrusion with the dynamic surface, wherein deforming the arm of the annular seal reduces a support pressure of a support protrusion of the annular seal.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which:

FIG. 2-1 is a radial cross-sectional view of a portion of the metal seal contacting an inner surface, according to at least some embodiments of the present disclosure.

FIG. 2-2 is a radial cross-sectional view of the portion of the metal seal of FIG. 2-1 dynamically contacting an outer surface, according to at least some embodiments of the present disclosure.

DETAILED DESCRIPTION

The present disclosure relates generally to fluid sealing in a downhole environment or surface environment. More particularly, the present disclosure relates to dynamic seals in a downhole environment where the seal is exposed to fluids with suspended material therein. In some embodiments, the seal is an annular metal seal for use in well completion or other applications in which the annular metal seal is positioned between an inner surface and an outer surface. In some embodiments, at least one of the inner surface and outer surface is dynamic relative to seal. For example, during well completion or other downhole applications, the outer surface (and/or inner surface) may be a dynamic surface that moves axially relative to the annular metal seal. The fluid against which the annular metal seal acts may include suspended debris, such as a formation fluid or a drilling fluid. The annular metal seal, in some embodiments, includes one or more scraping features to clean the dynamic surface and maintain the seal integrity.

In some embodiments, an annular metal seal includes an inner arm and/or an outer arm that applies an expansion force against the inner surface and outer surface to compress protrusions of the annular metal seal against the inner surface and outer surface. The expansion force is, in some embodiments, produced at least partially by an elastic restoring force of the annular metal seal when compressed between the inner surface and outer surface. In some embodiments, the expansion force is at least partially dependent on a fluid pressure in a volume between the inner arm and the outer arm.

Figure 1:
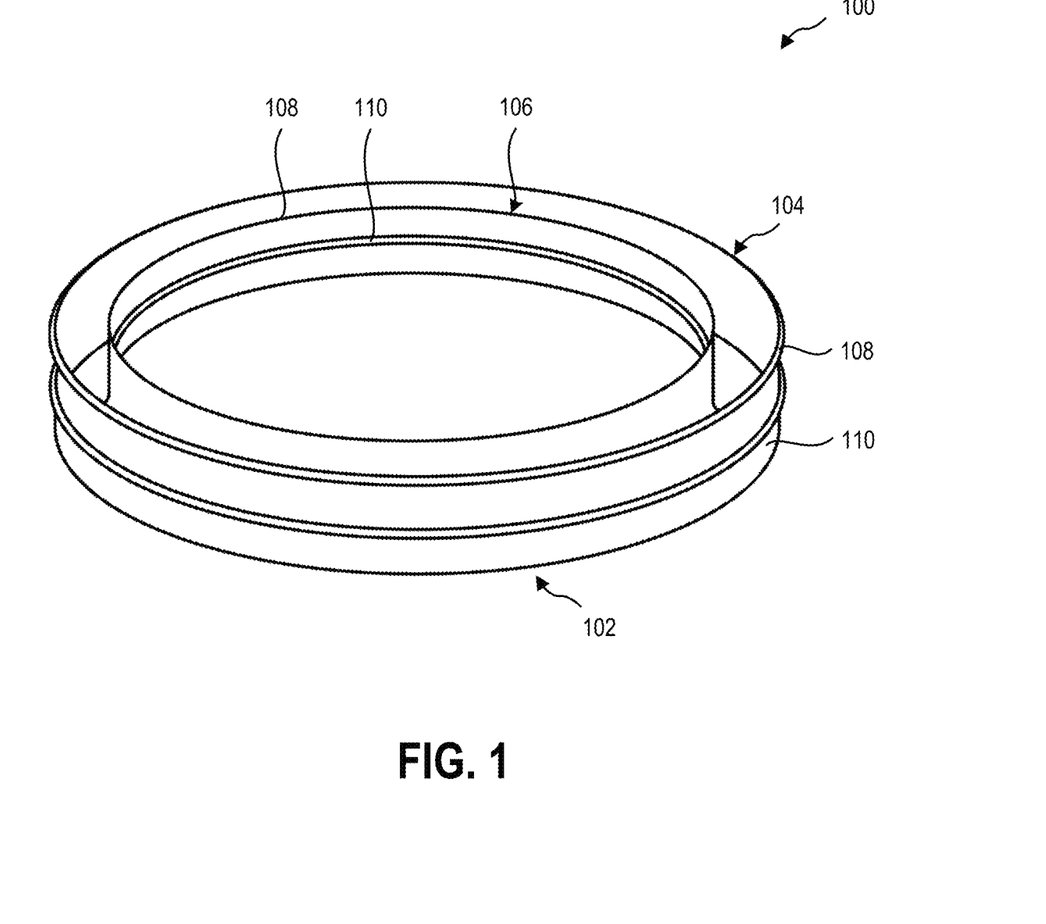
FIG. 1 is a perspective view of an annular metal seal, according to at least some embodiments of the present disclosure.

Referring now to FIG. 1, in some embodiments, the annular metal seal 100 includes a seal body 102 with an outer arm 104 and an inner arm 106 protruding axially therefrom. The annular metal seal 100 includes one or more seal protrusions 108 proximate to a distal end of the arms 104, 106 to create a seal between the arms 104, 106 of the seal 100 and the inner surface and outer surface against which the seal 100 creates the fluid seal. The seal protrusion 108 extends radially toward the adjacent surface to increase the pressure between the seal and the surface(s) at that point, which may produce elastic and/or plastic deformation of the seal protrusion 108 and/or surface material and create the fluid-tight seal. In some embodiments, the seal protrusion 108 is convex, such as parabolic, semi-elliptical, semi-circular, or other curved convex surface. In some embodiments, at least a portion of the seal protrusion 108 is planar, such as a triangular, trapezoidal, or partially planar and partially curved shape. The seal protrusion 108 is circumferential around the seal 100.

Figure 21:
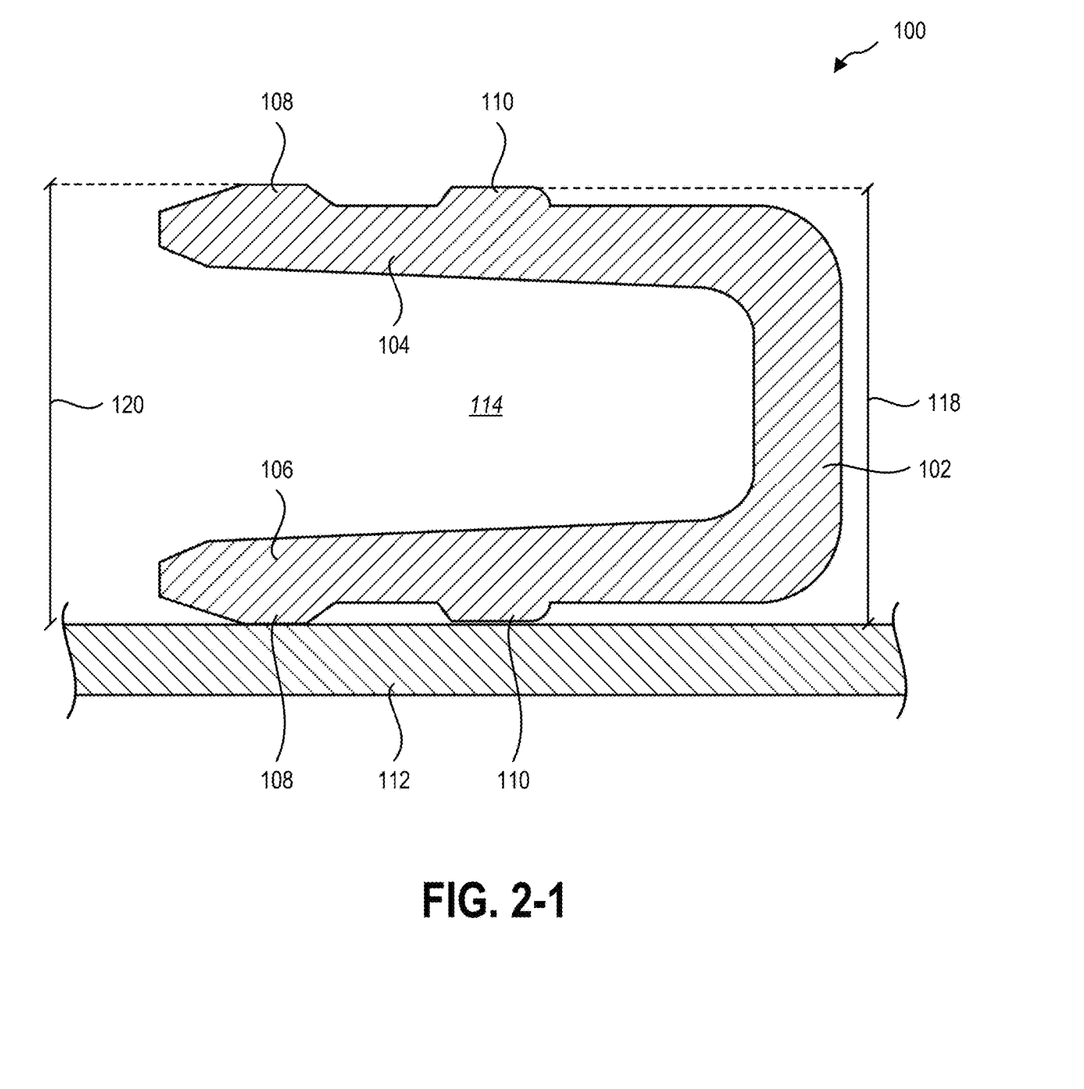

In some embodiments, the annular metal seal 100 includes one or more support protrusions 110. The support protrusion 110 is located on an arm of the seal axially between the seal body 102 and the seal protrusion 108. Referring now to FIG. 2-1, in some embodiments, the support protrusion 110 supports the arm (e.g., inner arm 106 or outer arm 104 on which the support protrusion is located) against the adjacent surface (e.g., inner surface 112) when in the compressed state. In some embodiments, the seal 100 experiences high fluid pressures in the volume 114 between the inner arm 106 and the outer arm 104. The fluid pressure, in some examples, applies a force to the arm(s) 104, 106 that can elastically or plastically deform the arm. Plastic deformation can result in a lower seal pressure at the seal protrusion(s) 108, compromising the fluid seal. The fluid pressure, in some examples, applies a force to the arm(s) 104, 106 that can elastically deform the arm. During repeated pressure cycling, deformation can fatigue the metal of the arm(s) 104, 106, increasing the risk of failure and/or reducing the operational lifetime of the seal 100.

Figure 22:
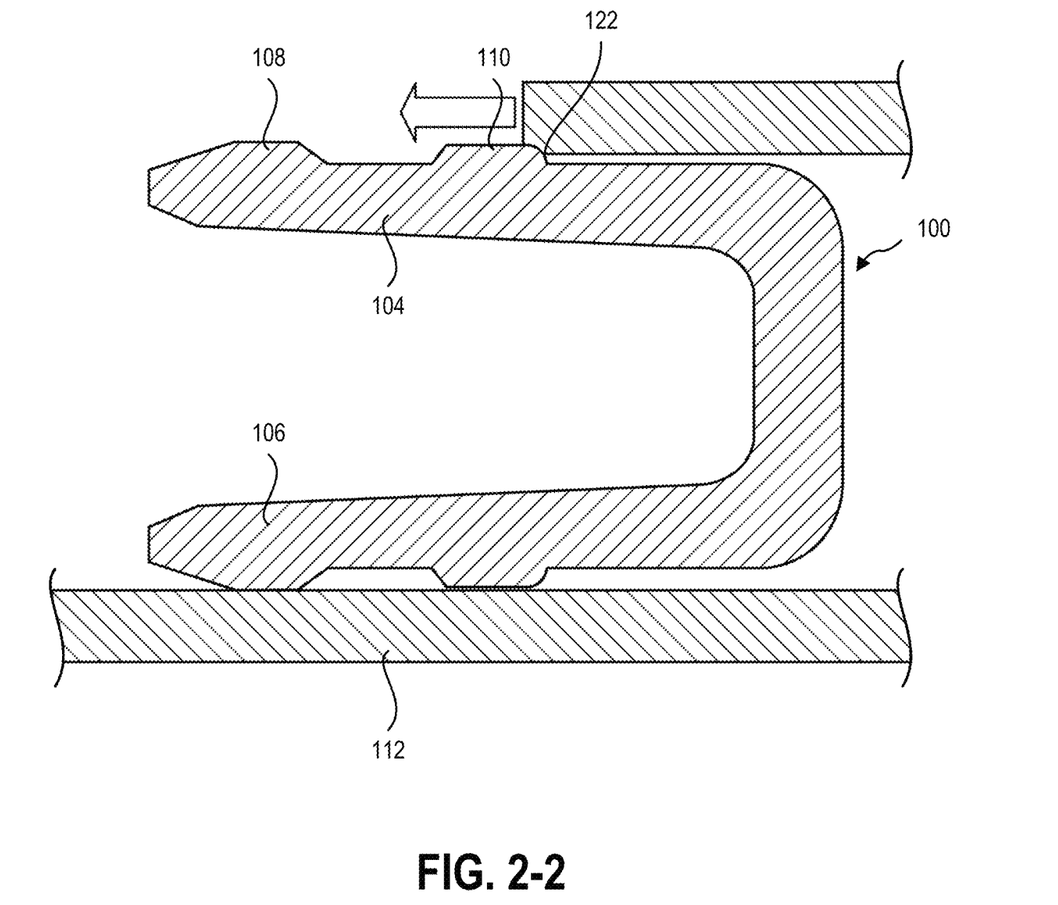

In some embodiments, the support protrusion 110 is substantially continuous around the full circumference (i.e., circumferential) around the annular seal 100 (such as in the embodiment illustrated in FIG. 1). For example, an inner support protrusion 110 may be circumferential around the annular seal 100 proximate to the inner surface 112 (e.g., radially inward). For example, an outer support protrusion 110 may be circumferential around the annular seal 100 proximate to the outer surface (e.g., radially outer surface 116 of FIG. 2-2).

In some embodiments, the support protrusions 110 (i.e., an inner support protrusion and an outer support protrusion) define a support width 118 of the seal 100, and the seal protrusions 108 (i.e., an inner seal protrusion and an outer seal protrusion) define a seal width 120 of the seal 100. In some embodiments, the support width 118 is less than the seal width 120 in an uncompressed state. For example, before the annular seal 100 is compressed between an inner surface 112 and an outer surface 116, and the seal 100 is in an elastically relaxed state, the support width 118 is less than the seal width 120. In some embodiments, the support width 118 is less than the seal width 120 in the compressed state. For example, when in a compressed state with the inner seal protrusion 108 and outer seal protrusion 108 contacting the inner surface 112 and outer surface 116, respectively, at least one of the inner support protrusion 110 and the outer support protrusion 110 does not contact the adjacent inner surface 112 or outer surface 116.

The support width 118 and the seal width 120 define a protrusion width ratio of the annular seal 100. In some embodiments, the protrusion width ratio is in a range having an upper value, a lower value, or upper and lower values including any of 0.99, 0.98, 0.97, 0.95, 0.925, 0.90, 0.85, 0.80, or any values therebetween. In some examples, the protrusion width ratio is less than 0.99. In some examples, the protrusion width ratio is greater than 0.80. In some examples, the protrusion width ratio is between 0.80 and 0.99. In some examples, the protrusion width ratio is between 0.85 and 0.98. In some examples, the protrusion width ratio is between 0.925 and 0.97.

The protrusion width ratio in combination with a material of the arms and/or seal body, in some embodiment, allows the seal to maintain a sufficient seal force applied to the seal protrusion(s) by positioning the seal protrusions radially externally (i.e., radially outward of the outer arm and radially inward of the inner arm) from the seal. In some embodiments, the seal force is greater than a support force applied radially externally from the support protrusion(s) of the seal in the compressed state. In at least one example, the support protrusion(s) does not contact the surface in the compressed state and the support force is zero. In some embodiments, the seal force is equal to a support force applied radially externally from the support protrusion(s) of the seal in the compressed state. In at least one embodiment, the seal force is less than a support force applied radially externally from the support protrusion(s) of the seal in the compressed state. For example, an annular seal with a plurality of non-circumferential support protrusions may apply a support force greater than the seal force applied by the seal protrusion(s) while maintaining a sufficient seal force.

In some embodiments, the annular seal applies a seal pressure that is based at least partially on the seal force and a geometry and/or material of the seal protrusion. For example, an apexed contact point of the seal protrusion (e.g., curved or pointed) between the seal protrusion and the surface with which the seal protrusion makes contact concentrates the seal force in a smaller surface area than a planar contact point which may distribute the seal force. In some embodiments, the seal pressure elastically and/or plastically deforms a portion of the seal protrusion and/or surface that the seal protrusion contacts such that the seal protrusion and surface mate and form a fluid seal. In some embodiments, the seal protrusion includes a coating having a lower hardness than the seal protrusion and/or arm of the seal to allow greater deformation of the seal protrusion at the contact point. In some embodiments, the coating is a metal, polymer, or other coating.

In some embodiments, the annular seal applies a support pressure that is based at least partially on the support force and a geometry and/or material of the support protrusion. For example, an apexed contact point of the support protrusion (e.g., curved or pointed) between the support protrusion and the surface with which the support protrusion makes contact concentrates the support force in a smaller surface area than a planar contact point which may distribute the support force. In some embodiments, the support protrusion has a planar contact surface to distribute the support force and lower the support pressure. In some embodiments, the support protrusion has an apexed edge in an axial direction that concentrates the support force and produces a scraping edge that cleans debris from the surface (e.g., a dynamic inner surface and/or dynamic outer surface) prior to the seal protrusion contacting (and sealing with) the surface. In some embodiments, a planar contact point scrapes the surface with which the support protrusion makes contact. In some embodiments, the support pressure elastically and/or plastically deforms a portion of the support protrusion and/or surface that the support protrusion contacts such that the support protrusion and surface mate and form a scraping edge. In some embodiments, the support protrusion includes a coating having a lower hardness than the support protrusion and/or arm of the support protrusion to allow greater deformation of the support protrusion at the contact point. In some embodiments, the coating is a metal, polymer, or other coating.

In some embodiments, the support protrusions 110 further axially center the dynamic surface 116 on the annular seal 100. For example, the support protrusion(s) 110 may have a tapered leading edge 122 (e.g., oriented away from the seal protrusion in an axial direction) that contact a portion of the dynamic surface and urge the dynamic surface 116 in a radial direction. In some embodiments, the support protrusions 110 may substantially center the inner surface 112 and outer surface 116 relative to one another whether the support protrusions 110 are circumferentially continuous or not.

Figure 3:
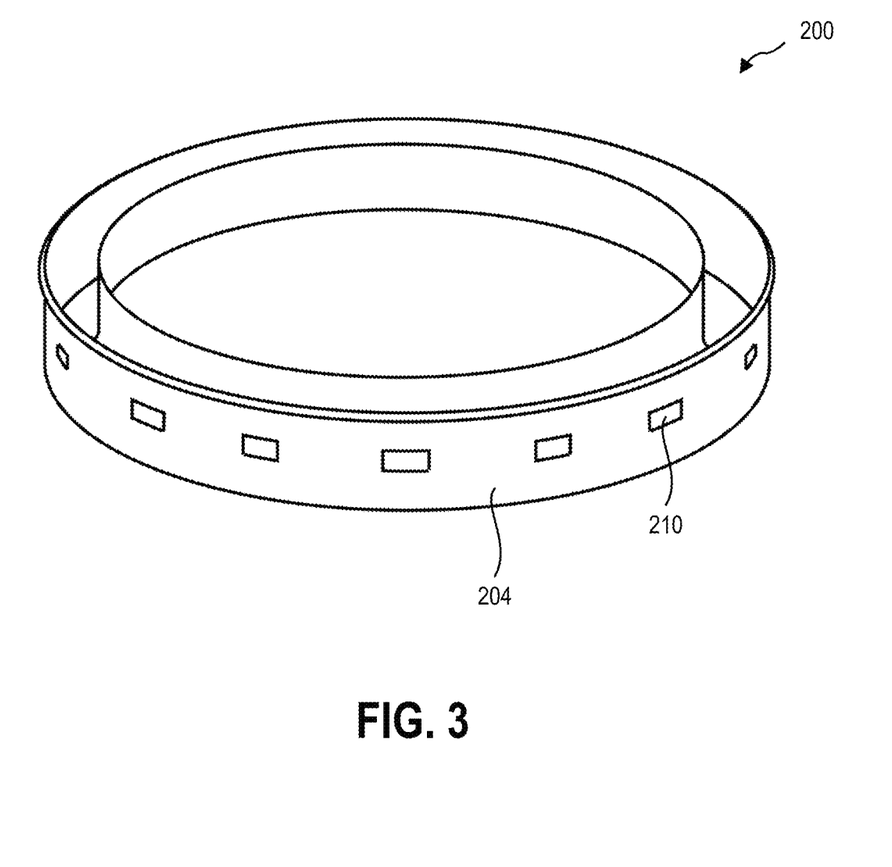
FIG. 3 is a perspective view of a metal seal with non-circumferential support protrusions, according to at least some embodiments of the present disclosure.

For example, FIG. 3 illustrates an embodiment of an annular seal 200 with non-continuous support protrusions 210 on an outer arm 204. In some embodiments, a support protrusion 210 is positioned around a portion of the circumference of the seal 200 that is less than the entire circumference. For example, a plurality of inner support protrusions 210 may be positioned around the circumference of the annular seal 200 proximate to the inner surface with gaps between the inner support protrusions. For example, a plurality of outer support protrusions 210 may be positioned around the circumference of the annular seal 200 proximate to the outer surface with gaps between the outer support protrusions.

Figure 4:
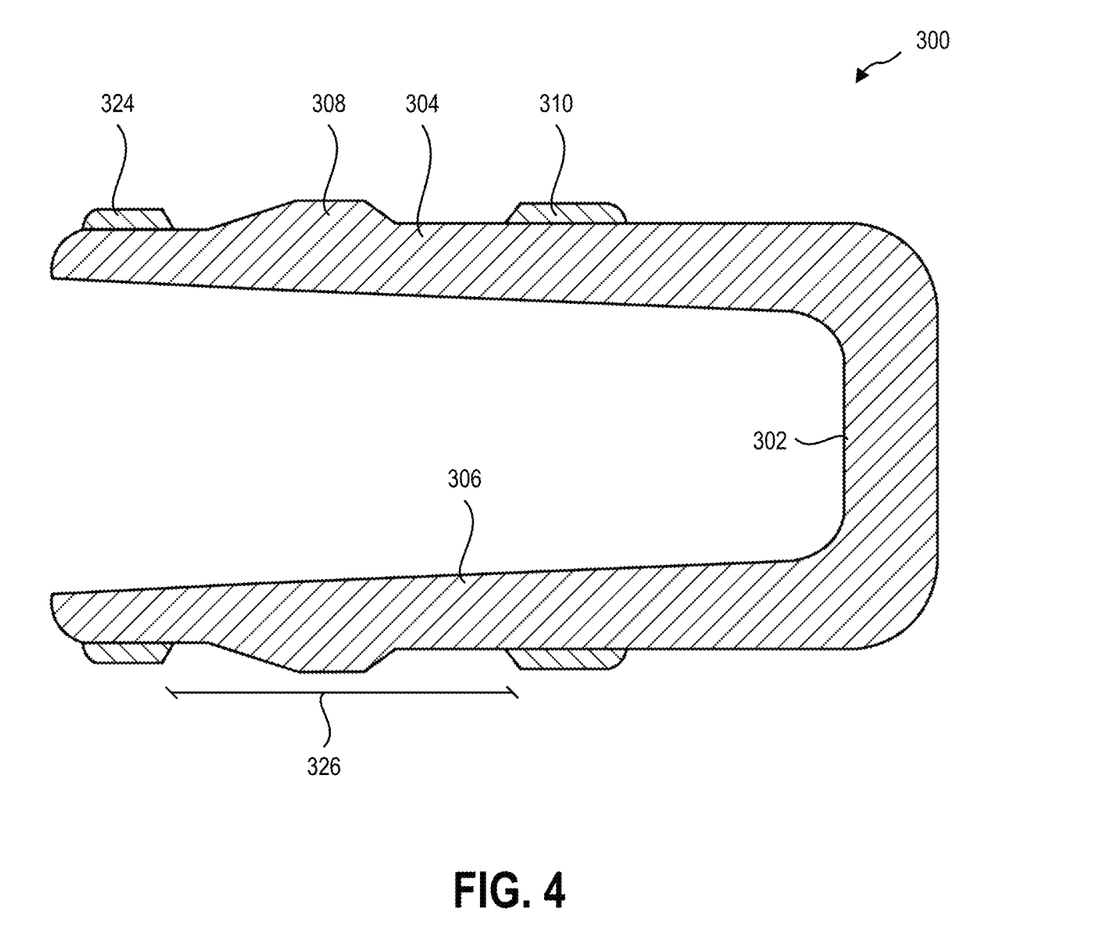
FIG. 4 is a radial cross-sectional view of a portion of a metal seal with a second support protrusion distal to a seal protrusion, according to at least some embodiments of the present disclosure.

FIG. 4 is a side cross-sectional view of another embodiment of a seal 300. In some embodiments, the annular seal 300 includes a seal material that is different from an arm material. For example, the seal protrusion(s) 308 may be formed by application of a seal material to a surface of the arm (e.g., inner arm or outer arm). In some embodiments, the seal material of an outer seal protrusion is different from the seal material of an inner seal protrusion. In some examples, the seal material is harder than the arm material to limit and/or prevent wear to the seal protrusion 308. In some examples, the seal material is a lubricious material to provide a relatively low coefficient of friction during mating of the seal protrusion with the surface. In some examples, the seal material is more compliant than the arm material to conform to the adjacent surface and form the fluid seal.

In some embodiments, the annular seal 300 includes an arm material that is different from a body material. For example, the arm material may have a larger elastic deformation regime (i.e., a larger amount of elastic deformation before plastic deformation) than the body material. In some embodiments, the arm(s) and the seal body 302 of the seal 300 are made of a single material. For example, the arm(s) 304, 306 and the seal body 302 may be integrally formed with one another in a monolithic construction.

In some embodiments, the annular seal 300 includes a support material that is different from the arm material. For example, the support protrusion(s) 310 may be formed by application of a support material to a surface of the arm 304, 306 (e.g., inner arm or outer arm). In some examples, the support material is harder than the arm material to limit and/or prevent wear to the support protrusion 310. In some examples, the support material is a lubricious material to provide a relatively low coefficient of friction during mating of the support protrusion 310 with the surface. In some examples, the support material is more compliant than the arm material to conform to the adjacent surface and scrape the adjacent surface and provide a clean adjacent surface for the fluid seal.

In some embodiments, the annular seal 300 includes a seal material that is different from the support material. For example, the seal material may be the arm material and the support material is a second material different from the arm material. In some examples, the seal material may be a second material and the support material is the arm material. In some examples, the seal material and the support material are both different from the arm material. In some embodiments, the seal material and the support material are the same as one another and different from the arm material.

An annular seal 300 according to some embodiments of the present disclosure is used in a dynamic application where the dynamic surface moves axially relative to seal in both axial directions. In some embodiments, an annular seal 300 includes a second support protrusion 324 to clean the dynamic surface in the opposite direction during repeated stabs. For example, the seal protrusion 308 is located axially between a first support protrusion 310 and a second support protrusion 324 on the same arm 304, 306. In some embodiments, one or both of the first support protrusion 310 and second support protrusion 324 contact the adjacent surface in the compressed state. For example, the first support protrusion 310 and second support protrusion 324 may create a zone 326 therebetween in which debris is prevented and/or minimized to allow the seal protrusion to maintain a fluid seal with the adjacent surface during movement of the dynamic surface relative to the annular seal 300.

In some embodiments, the seal force is greater than at least one of the support forces (e.g., a first support force applied by the first support protrusion 310 and a second support force applied by the second support protrusion 324). In some embodiments, the seal force is greater than both of the support forces. In some embodiments, the seal force is less than the support forces. In some embodiments, the seal pressure is greater than at least one of the support pressures (e.g., a first support pressure applied by the first support protrusion 310 and a second support pressure applied by the second support protrusion 324). In some embodiments, the seal pressure is greater than both of the support pressures. In some embodiments, the seal pressure is less than the support pressures.

An annular seal, according to at least some embodiments described herein, may be used in a pair with additional sealing elements axially therebetween to provide a robust and reliable fluid seal. In some embodiments, a sealing system includes a first seal, according to any of the embodiments described herein, and a second seal, according to any of the embodiments described herein. In some examples, the first seal and the second seal are the same. In some examples, the first seal and second seal are different. The sealing system, in some embodiments, includes at least a first support ring proximate to the first seal and configured to axially support the first seal and a second support ring proximate to the second seal and configured to axially support the second seal.

Figure 5:
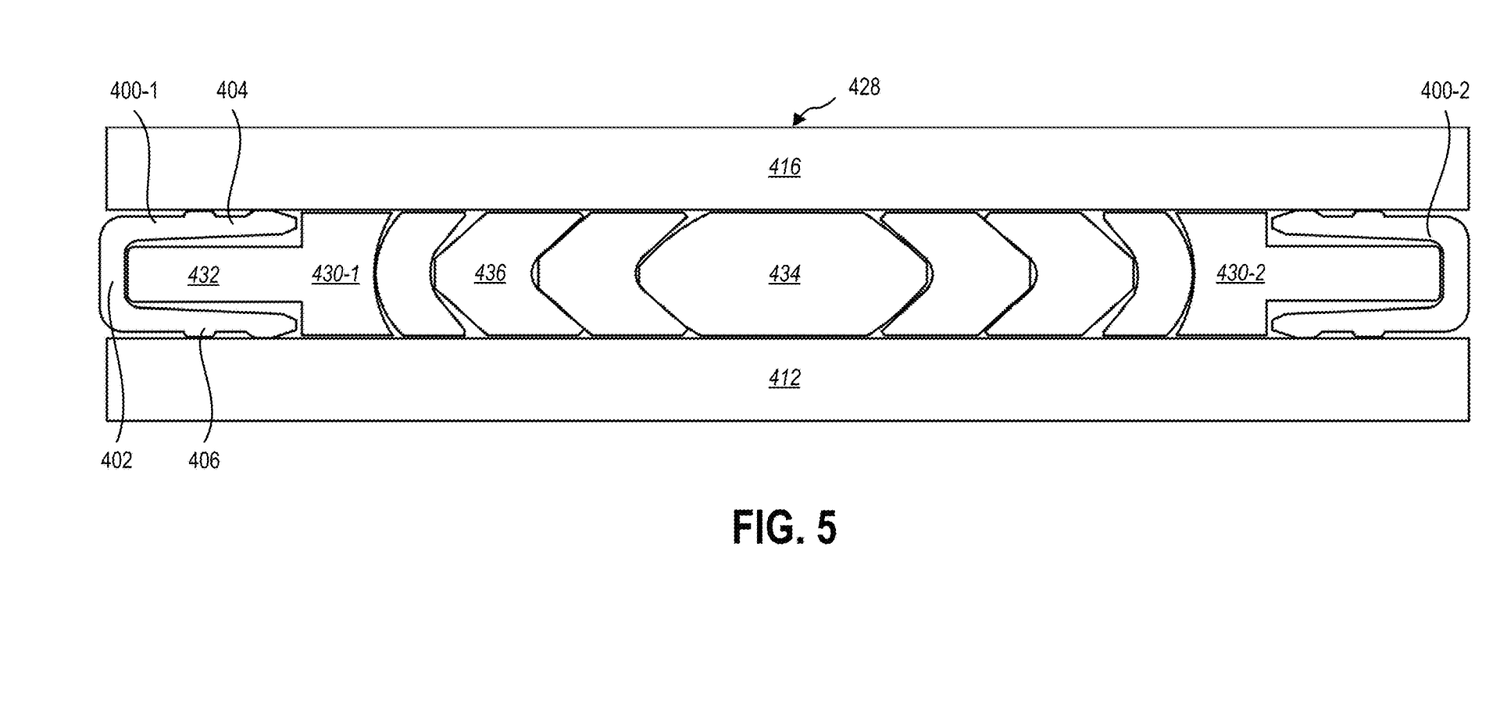
FIG. 5 is a side cross-sectional view of a portion of a sealing system, according to at least some embodiments of the present disclosure.

Referring now to FIG. 5, in some embodiments, the first seal 400-1 is oriented with the seal body 402 axially away from the scaling system 428 (e.g., away from the first support ring 430-1). In such examples, the arms 404, 406 of the first seal 400-1 protrude axially from the seal body 402. In some embodiments, the support ring 430-1 has an axial protrusion 432 positioned between the inner arm 406 and outer arm 404 of the seal 400. In some embodiments, the axial protrusion 432 contacts the seal body 402 and axially supports the seal body 402. In some embodiments, the axial protrusion 432 contacts the inner arm 406 and/or outer arm 404 of the seal 400 and supports the arm(s) 404, 406 in the radial direction (e.g., transverse to the axial direction).

Figure 6:
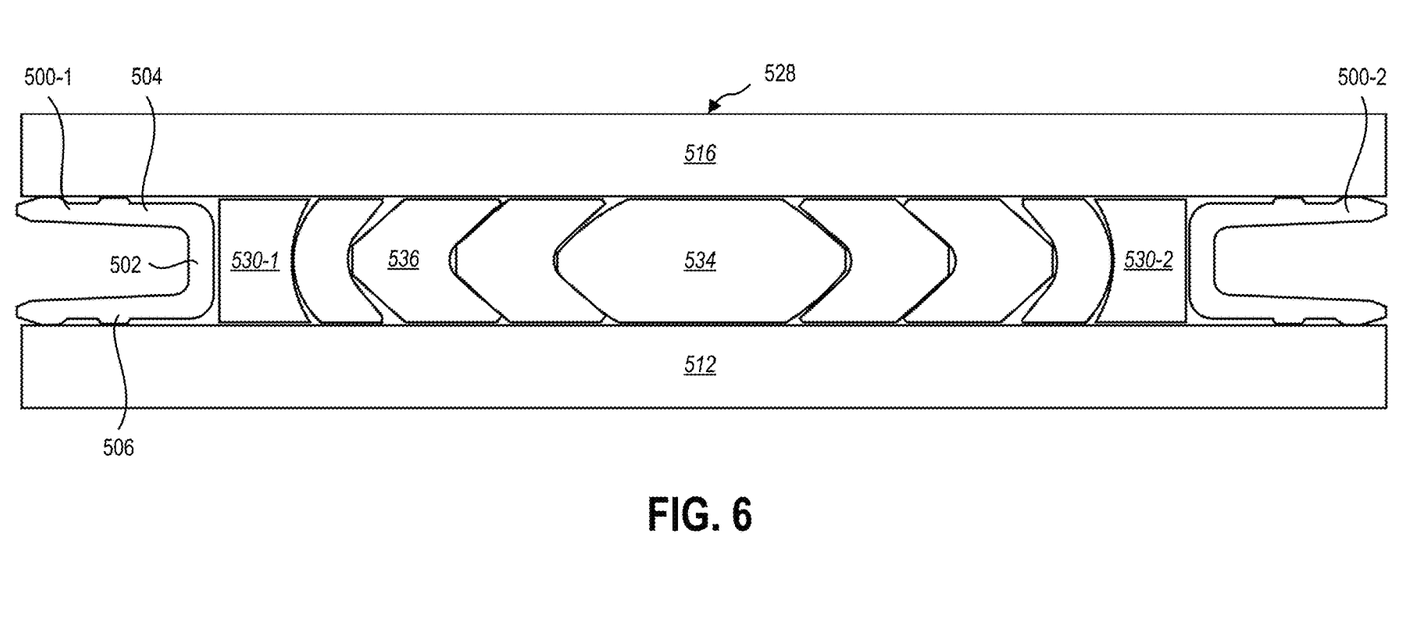
FIG. 6 is a side cross-sectional view of a portion of another sealing system, according to at least some embodiments of the present disclosure.

Referring now to FIG. 6, in some embodiments, the first seal 500-1 is oriented with the seal body 502 toward the sealing system 528 and the arms 504, 506 protrude in the axial direction away from the first support ring 530-1. In such embodiments, the support ring 530-1 is positioned against the seal body 502 in the axial direction to support the seal body 502 in the axial direction. In some embodiments, the support ring 530-1 is non-metal, such as a thermoplastic or elastomeric material with a greater compliance than the seal.

The support ring(s) 430-1, 430-2, 530-1, 530-2, in some embodiments, transmits force from the seal 400-1, 400-2, 500-1, 500-2 (such as a force applied axially by a fluid) to a sealing adaptor 434, 534. The scaling adaptor 434, 534 receives axial force from the support ring(s) 430-1, 430-2, 530-1, 530-2 and, upon axial compression, expands radially against the inner surface 412, 512 and outer surface 416, 516 to further seal the volume between the inner surface 412, 512 and the outer surface 416, 516. In some embodiments, the sealing adaptor 434, 534 is a thermoplastic or elastomeric material that allows repeated cycling of deformation with limited or no fatigue.

A sealing system 428, 528, according to some embodiments of the present disclosure, further includes one or more sealing v-rings 436, 536 positioned axially between a support ring 430-1, 430-2, 530-1, 530-2 and the scaling adaptor 434, 534. In some embodiments, the scaling v-rings 436, 536 have a v-shaped cross-section that allows the v-ring 436, 536 to deform and deflect radially upon axial compression to further seal the volume between the inner surface and the outer surface. In some embodiments, the sealing v-ring(s) 436, 536 transmit axial force from the support ring(s) 430-1, 430-2, 530-1, 530-2 to the scaling adaptor 434, 534. In some embodiments, the sealing v-ring 436, 536 is a thermoplastic or elastomeric material that allows repeated cycling of deformation with limited or no fatigue.

Figure 7:
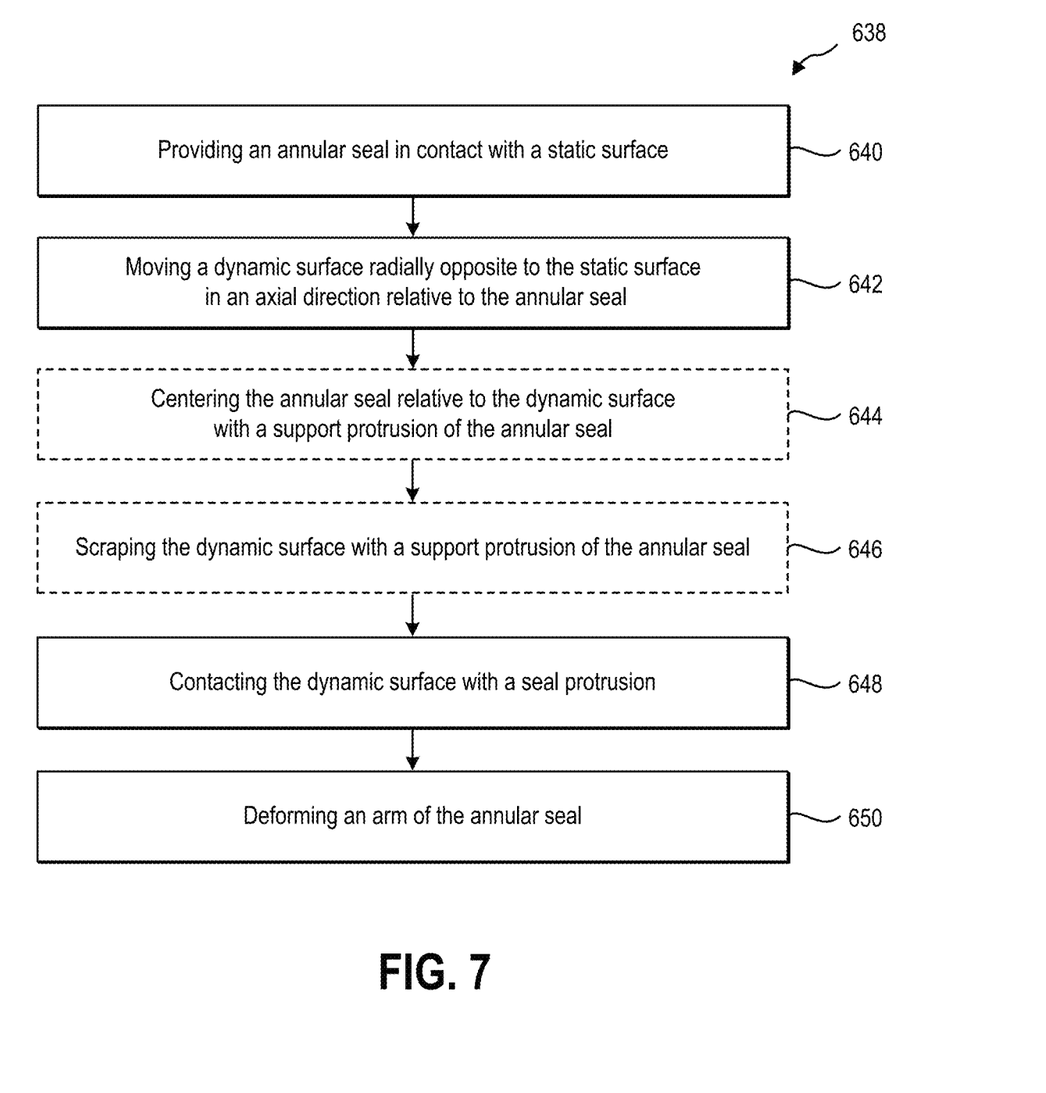
FIG. 7 is a flowchart illustrating a method of sealing in a downhole environment, according to at least some embodiments of the present disclosure.

FIG. 7 is a flowchart illustrating a method 638 of scaling an annular volume, according to some embodiments of the present disclosure. The method 638 includes providing an annular seal, according to any embodiments described herein, on a static surface at 640. In some embodiments, the static surface is an outer surface (e.g., inner diameter of a pipe or other element) relative to the annular seal. In some embodiments, the static surface is an inner surface (e.g., outer diameter of a pipe or other element) relative to the annular seal.

The method further includes moving a dynamic surface radially opposite to the static surface in an axial direction relative to the annular seal at 642. In some embodiments, the axial movement of the dynamic surface relative to the annular seal results in the annular seal contacting a portion of the dynamic surface with a support protrusion and deforming an arm of the annular seal. In some embodiments, the support protrusion axially centers (e.g., in the radial direction), optionally, the annular seal relative to the dynamic surface at 644. In some embodiments, the support protrusion, optionally, scrapes at least a portion of a surface with which the support protrusion contacts to produce a scraped dynamic surface at 646. In some embodiments, the support protrusion, optionally, scrapes at least a portion of a surface with which the support protrusion contacts to produce a scraped static surface during initial placement of the seal. In some embodiments, both surfaces are dynamic surfaces.

In some embodiments, continued axial movement of the dynamic surface relative to the annular seal causes the support protrusion to continue sliding on the dynamic surface until a seal protrusion of the annular seal contacts the dynamic surface at 648. In some embodiments, the seal protrusion contacts the scraped dynamic surface. The seal protrusion applies a seal pressure to the dynamic surface to create a fluid seal between the annular seal and the dynamic surface.

In some embodiments, contact between the seal protrusion and the dynamic surface produces a deformation (elastic and/or plastic deformation) of the arm supporting the seal protrusion relative to a seal body of the annular seal at 650. In some embodiments, the deformation of the arm lifts the support protrusion from the dynamic surface. For example, deformation of the arm between the support protrusion and the seal body may cause the support protrusion to lift from the dynamic surface.

In some embodiments, the deformation of the arm does not lift the support protrusion from the dynamic surface. For example, deformation of the arm between the seal protrusion and the support protrusion may not cause the support protrusion to lift from the dynamic surface. In some embodiments, the support pressure is zero, as the support protrusion is not in contact with the dynamic surface. In some embodiments, the support pressure is greater than zero, as the support protrusion is in contact with the dynamic surface. In some embodiments, the seal pressure of the seal protrusion against the dynamic surface is greater than the support pressure in the compressed state.

Annular seals according to at least some embodiments of the present disclosure provide improved and robust fluid seal in a downhole environment. In some embodiments, annular seals according to the present disclosure center the dynamic surface during mating of the seal. In some embodiments, annular seals according to the present disclosure scrape the dynamic surface to provide a clean surface against which the annular seal may contact and create the fluid seal.

INDUSTRIAL APPLICABILITY

The present disclosure relates generally to fluid sealing in a downhole environment or surface environment. More particularly, the present disclosure relates to dynamic seals in a downhole environment where the seal is exposed to fluids with suspended material therein. In some embodiments, the seal is an annular metal seal for use in well completion or other applications in which the annular metal seal is positioned between an inner surface and an outer surface. In some embodiments, at least one of the inner surface and outer surface is dynamic relative to seal. For example, during well completion or other downhole applications, the outer surface (and/or inner surface) may be a dynamic surface that moves axially relative to the annular metal seal. The fluid against which the annular metal seal acts may include suspended debris, such as a formation fluid or a drilling fluid. The annular metal seal, in some embodiments, includes one or more scraping features to clean the dynamic surface and maintain the seal integrity.

In some embodiments, the annular metal seal includes an inner arm and/or an outer arm that applies an expansion force against the inner surface and outer surface to compress protrusions of the annular metal seal against the inner surface and outer surface. The expansion force is, in some embodiments, produced at least partially by an elastic restoring force of the annular metal seal when compressed between in the inner surface and outer surface. In some embodiments, the expansion force is at least partially dependent on a fluid pressure in a volume between the inner arm and the outer arm.

The annular metal includes one or more seal protrusions to create a seal between the arms of the seal and the inner surface and outer surface against which the seal creates the fluid seal. The seal protrusion extends radially toward the adjacent surface to increase the pressure between the seal and the surface(s) at that point, which may produce elastic and/or plastic deformation of the seal protrusion and/or surface material and create the fluid-tight seal. In some embodiments, the seal protrusion is convex, such as parabolic, semi-elliptical, semi-circular, or other curved convex surface. In some embodiments, at least a portion of the seal protrusion is planar, such as a triangular, trapezoidal, or partially planar and partially curved shape. The protrusion is circumferential around the seal.

In some embodiments, the annular metal seal includes one or more support protrusions. The support protrusion is located on an arm of the seal axially between the seal body and the seal protrusion. In some embodiments, the support protrusion supports the arm (e.g., inner or outer arm on which the support protrusion is located) against the adjacent surface when in the compressed state. In some embodiments, the seal experiences high fluid pressures in the volume between the inner arm and the outer arm. The fluid pressure, in some examples, applies a force to the arm(s) that can elastically or plastically deform the arm. The plastic deformation can result in a lower seal pressure at the seal protrusion(s), compromising the fluid seal. The fluid pressure, in some examples, applies a force to the arm(s) that can elastically deform the arm. During repeated pressure cycling, deformation can fatigue the metal of the arm(s), increasing the risk of failure and/or reducing the operational lifetime of the seal.

In some embodiments, the support protrusion is substantially continuous around the full circumference (i.e., circumferential) around the annular seal. For example, an inner support protrusion may be circumferential around the annular seal proximate to the inner surface (e.g., radially inward). For example, an outer support protrusion may be circumferential around the annular seal proximate to the outer surface (e.g., radially outward). In some embodiments, a support protrusion is positioned around a portion of the circumference of the seal that is less than the entire circumference. For example, a plurality of inner support protrusions may be positioned around the circumference of the annular seal proximate to the inner surface with gaps between the inner support protrusions.

In some embodiments, the support protrusions (i.e., an inner support protrusion and an outer support protrusion) define a support width of the seal, and the seal protrusions (i.e., an inner seal protrusion and an outer seal protrusion) define a seal width of the seal. In some embodiments, the support width is less than the seal width in an uncompressed state. For example, before the annular seal is compressed between an inner surface and an outer surface, and the seal is in an elastically relaxed state, the support width is less than the seal width. In some embodiments, the support width is less than the seal width in the compressed state. For example, when in a compressed state with the inner seal protrusion and outer seal protrusion contacting the inner surface and outer surface, respectively, at least one of the inner support protrusion and the outer support protrusion does not contact the adjacent inner or outer surface. In some embodiments, the The support width and the seal width define a protrusion width ratio of the annular seal. In some embodiments, the protrusion width ratio is in a range having an upper value, a lower value, or upper and lower values including any of 0.99, 0.98, 0.97, 0.95, 0.925, 0.90, 0.85, 0.80, or any values therebetween. In some examples, the protrusion width ratio is less than 0.99. In some examples, the protrusion width ratio is greater than 0.80. In some examples, the protrusion width ratio is between 0.80 and 0.99. In some examples, the protrusion width ratio is between 0.85 and 0.98. In some examples, the protrusion width ratio is between 0.925 and 0.97.

The protrusion width ratio in combination with a material of the arms and/or seal body, in some embodiment, allows the seal to maintain a sufficient seal force applied to the seal protrusion(s) by positioning the seal protrusions radially externally (i.e., radially outward of the outer arm and radially inward of the inner arm) from the seal. In some embodiments, the seal force is greater than a support force applied radially externally from the support protrusion(s) of the seal in the compressed state. In at least one example, the support protrusion(s) does not contact the surface in the compressed state and the support force is zero. In some embodiments, the seal force is equal to a support force applied radially externally from the support protrusion(s) of the seal in the compressed state. In at least one embodiment, the seal force is less than a support force applied radially externally from the support protrusion(s) of the seal in the compressed state. For example, an annular seal with a plurality of non-circumferential support protrusions may apply a support force greater than the seal force applied by the seal protrusion(s) while maintaining a sufficient seal force.

In some embodiments, the annular seal applies a seal pressure that is based at least partially on the seal force and a geometry and/or material of the seal protrusion. For example, an apexed contact point of the seal protrusion (e.g., curved or pointed) between the seal protrusion and the surface with which the seal protrusion makes contact concentrates the seal force in a smaller surface area than a planar contact point which may distribute the seal force. In some embodiments, the seal pressure elastically and/or plastically deforms a portion of the seal protrusion and/or surface the seal protrusion contacts such that the seal protrusion and surface mate and form a fluid seal. In some embodiments, the seal protrusion includes a coating having a lower hardness than the seal protrusion and/or arm of the seal to allow greater deformation of the seal protrusion at the contact point. In some embodiments, the coating is a metal, polymer, or other coating.

In some embodiments, the annular seal applies a support pressure that is based at least partially on the support force and a geometry and/or material of the support protrusion. For example, an apexed contact point of the support protrusion (e.g., curved or pointed) between the support protrusion and the surface with which the support protrusion makes contact concentrates the support force in a smaller surface area than a planar contact point which may distribute the support force. In some embodiments, the support protrusion has a planar contact surface to distribute the support force and lower the support pressure. In some embodiments, the support protrusion has an apexed edge in an axial direction that concentrates the support force and produces a scraping edge that cleans debris from the surface (e.g., a dynamic inner surface and/or dynamic outer surface) prior to the seal protrusion contacting (and sealing with) the surface. In some embodiments, the support pressure elastically and/or plastically deforms a portion of the support protrusion and/or surface the support protrusion contacts such that the support protrusion and surface mate and form a scraping edge. In some embodiments, the support protrusion includes a coating having a lower hardness than the support protrusion and/or arm of the support protrusion to allow greater deformation of the support protrusion at the contact point. In some embodiments, the coating is a metal, polymer, or other coating.

In some embodiments, the support protrusions further axially center the dynamic surface on the annular seal. For example, the support protrusion(s) may have a tapered leading edge (e.g., oriented away from the seal protrusion in an axial direction) that contact a portion of the dynamic surface and urge the dynamic surface in a radial direction. In some embodiments, the support protrusions may substantially center the inner surface and outer surface relative to one another whether the support protrusions are circumferentially continuous or not.

In some embodiments, the annular seal includes a seal material that is different from an arm material. For example, the seal protrusion(s) may be formed by application of a seal material to a surface of the arm (e.g., inner arm or outer arm). In some examples, the seal material is harder than the arm material to limit and/or prevent wear to the seal protrusion. In some examples, the seal material is a lubricious material to provide a relatively low coefficient of friction during mating of the seal protrusion with the surface. In some examples, the seal material is more compliant than the arm material to conform to the adjacent surface and form the fluid seal.

In some embodiments, the annular seal includes an arm material that is different from a body material. For example, the arm material may have a larger elastic deformation regime (i.e., a larger amount of elastic deformation before plastic deformation) than the body material. In some embodiments, the arm(s) and the seal body of the seal are made of a single material. For example, the arm(s) and the seal body may be integrally formed with one another in a monolithic construction.

In some embodiment, the annular seal includes a support material that is different from the arm material. For example, the support protrusion(s) may be formed by application of a support material to a surface of the arm (e.g., inner arm or outer arm). In some examples, the support material is harder than the arm material to limit and/or prevent wear to the support protrusion. In some examples, the support material is a lubricious material to provide a relatively low coefficient of friction during mating of the support protrusion with the surface. In some examples, the support material is more compliant than the arm material to conform to the adjacent surface and scrape the adjacent surface and provide a clean adjacent surface for the fluid seal.

In some embodiments, the annular seal includes a seal material that is different from the support material. For example, the seal material may be the arm material and the support material is a second material different from the arm material. In some examples, the seal material may be a second material and the support material is the arm material. In some examples, the seal material and the support material are both different from the arm material. In some embodiments, the seal material and the support material are the same as one another and different from the arm material.

An annular seal according to some embodiments of the present disclosure is used in a dynamic application where the dynamic surface moves axially relative to seal in both axial directions. In some embodiments, an annular seal includes a second support protrusion to clean the dynamic surface in the opposite direction during repeated stabs. For example, the seal protrusion is located axially between a first support protrusion and a second support protrusion on the same arm. In some embodiments, one or both of the first support protrusion and second support protrusion contact the adjacent surface in the compressed state. For example, the first support protrusion and second support protrusion may create a zone therebetween in which debris is prevented and/or minimized to allow the seal protrusion to maintain a fluid seal with the adjacent surface during movement of the dynamic surface relative to the annular seal.

In some embodiments, the seal force is greater than at least one of the support forces (e.g., a first support force applied by the first support protrusion and a second support force applied by the second support protrusion). In some embodiments, the seal force is greater than both of the support forces. In some embodiments, the seal force is less than the support forces. In some embodiments, the seal pressure is greater than at least one of the support pressures (e.g., a first support pressure applied by the first support protrusion and a second support pressure applied by the second support protrusion). In some embodiments, the seal pressure is greater than both of the support pressures. In some embodiments, the seal pressure is less than the support pressures.

An annular seal, according to at least some embodiments described herein, may be used in a pair with additional sealing elements axially therebetween to provide a robust and reliable fluid seal. In some embodiments, a sealing system includes a first seal, according to any of the embodiments described herein, and a second seal, according to any of the embodiments described herein. In some examples, the first seal and the second seal are the same. In some examples, the first seal and second seal are different. The sealing system, in some embodiments, includes at least a first support ring proximate to the first seal and configured to axially support the first seal and a second support ring proximate to the second seal and configured to axially support the second seal.

In some embodiments, the first seal is oriented with the seal body axially away from the scaling system (e.g., away from the first support ring). In such examples, the arms of the first seal protrude axially from the seal body and define a volume radially therebetween. In some embodiments, the support ring has an axial protrusion positioned between the inner arm and outer arm of the seal. In some embodiments, the axial protrusion contacts the seal body and axially supports the seal body. In some embodiments, the axial protrusion contacts the inner arm and/or outer arm of the seal and supports the arm(s) in the radial direction (e.g., transverse to the axial direction).

In some embodiments, the first seal is oriented with the seal body toward the sealing system and the arms protrude in the axial direction away from the first support ring. In such embodiments, the support ring is positioned against the seal body in the axial direction to support the seal body in the axial direction. In some embodiments, the support ring is non-metal, such as a thermoplastic or elastomeric material with a greater compliance than the seal.

The support ring(s), in some embodiments, transmits force from the seal (such as a force applied axially by a fluid) to a sealing adaptor. The sealing adaptor receives axial force from the support ring(s) and, upon axial compression, expands radially against the inner surface and outer surface to further seal the volume between the inner surface and the outer surface. In some embodiments, the sealing adaptor is a thermoplastic or elastomeric material that allows repeated cycling of deformation with limited or no fatigue.

A sealing system, according to some embodiments of the present disclosure, further includes one or more sealing v-rings positioned axially between a support ring and the sealing adaptor. In some embodiments, the sealing v-rings have a v-shaped cross-section that allows the v-ring to deform and deflect radially upon axial compression to further seal the volume between the inner surface and the outer surface. In some embodiments, the sealing v-ring(s) transmit axial force from the support ring(s) to the sealing adaptor. In some embodiments, the sealing v-ring is a thermoplastic or elastomeric material that allows repeated cycling of deformation with limited or no fatigue.

A method of sealing an annular volume, according to some embodiments of the present disclosure, includes providing an annular seal, according to any embodiments described herein, on a static surface. In some embodiments, the static surface is an outer surface (e.g., inner diameter of a pipe or other element) relative to the annular seal. In some embodiments, the static surface is an inner surface (e.g., outer diameter of a pipe or other element) relative to the annular seal.

The method further includes moving a dynamic surface radially opposite to the static surface in an axial direction relative to the annular seal. In some embodiments, the axial movement of the dynamic surface relative to the annular seal results in the annular seal contacting a portion of the dynamic surface with a support protrusion and elastically deforming an arm of the annular seal. In some embodiments, the support protrusion axially (e.g., in the radial direction) centers the annular seal relative to the dynamic surface. In some embodiments, the support protrusion, optionally, scrapes at least a portion of a surface with which the support protrusion contacts to produce a scraped dynamic surface. In some embodiments, the support protrusion, optionally, scrapes at least a portion of a surface with which the support protrusion contacts to produce a scraped static surface during initial placement of the seal. In some embodiments, both surfaces are dynamic surfaces.

In some embodiments, continued axial movement of the dynamic surface relative to the annular seal causes the support protrusion to continue sliding on the dynamic surface until a seal protrusion of the annular seal contacts the dynamic surface. In some embodiments, the seal protrusion contacts the scraped dynamic surface. The seal protrusion applies a seal pressure to the dynamic surface to create a fluid seal between the annular seal and the dynamic surface.

In some embodiments, contact between the seal protrusion and the dynamic surface produces a deformation (elastic and/or plastic deformation) of the arm supporting the seal protrusion relative to a seal body of the annular seal. In some embodiments, the deformation of the arm lifts the support protrusion from the dynamic surface. For example, deformation of the arm between the support protrusion and the seal body may cause the support protrusion to lift from the dynamic surface.

In some embodiments, the deformation of the arm does not lift the support protrusion from the dynamic surface. For example, deformation of the arm between the seal protrusion and the support protrusion may not cause the support protrusion to lift from the dynamic surface. In some embodiments, the support pressure is zero, as the support protrusion is not in contact with the dynamic surface. In some embodiments, the support pressure is greater than zero, as the support protrusion is in contact with the dynamic surface. In some embodiments, the seal pressure of the seal protrusion against the dynamic surface is greater than the support pressure in the compressed state.

Annular seals according to at least some embodiments of the present disclosure provide improved and robust fluid seal in a downhole environment. In some embodiments, annular seals according to the present disclosure center the dynamic surface during mating of the seal. In some embodiments, annular seals according to the present disclosure scrape the dynamic surface to provide a clean surface against which the annular seal may contact and create the fluid seal.

The present disclosure relates to systems and methods for providing a fluid seal in a downhole environment according to any of the following:

Clause 1. A seal comprising: a seal body; an inner arm protruding from the seal body and configured to mate with an inner surface, the inner arm including: an inner seal protrusion proximate to a distal end of the inner arm, and an inner support protrusion; and an outer arm protruding from the seal body and configured to mate with an outer surface, the outer arm including: an outer seal protrusion proximate to a distal end of the outer arm, and an outer support protrusion, wherein the inner seal protrusion and outer seal protrusion define a seal width, and the inner support protrusion and outer support protrusion define a support width less than the seal width in an uncompressed state.

Clause 2. The seal of clause 1, further comprising a coating on at least one of the inner seal protrusion and outer seal protrusion.

Clause 3. The seal of clause 1, wherein at least one support protrusion includes a support material that is different from a seal material of at least one seal protrusion.

Clause 4. The seal of clause 1, wherein the outer seal protrusion includes a different material from the inner seal protrusion.

Clause 5. The seal of clause 1, wherein the outer support protrusion includes a different material from the outer seal protrusion.

Clause 6. The seal of clause 1, wherein at least one support protrusion includes a different material from the seal body.

Clause 7. The seal of clause 1, wherein at least one of the inner seal protrusion and outer seal protrusion includes a different material from the seal body.

Clause 8. The seal of clause 1, wherein at least one of the outer support protrusion and the inner support protrusion is non-continuous around a circumference of the seal.

Clause 9. The seal of clause 1, further comprising a second support protrusion distal to the outer seal protrusion on the outer arm.

Clause 10. The seal of clause 1, further comprising a second support protrusion distal to the inner seal protrusion on the inner arm.

Clause 11. The seal of clause 1, wherein at least one of the outer support protrusion and the inner support protrusion has a scraping edge proximate to the seal body.

Clause 12. A sealing system comprising: a first seal including: a seal body; an inner arm protruding from the seal body and configured to mate with an inner surface, the inner arm including: an inner seal protrusion proximate to a distal end of the inner arm, and an inner support protrusion, and an outer arm protruding from the seal body and configured to mate with an outer surface, the outer arm including: an outer seal protrusion proximate to a distal end of the outer arm, and an outer support protrusion, wherein the inner seal protrusion and outer seal protrusion define a seal width, and the inner support protrusion and outer support protrusion define a support with width; a first support ring proximate to the first seal and configured to axially support the first seal; a second seal positioned in an axial direction opposite the first seal and across the first support ring; and a second support ring proximate to the second seal and configured to axially support the second seal between the second seal and the first support ring.

Clause 13. The sealing system of clause 12, wherein the first support ring includes an axial protrusion positioned between the inner arm and outer arm of the first seal.

Clause 14. The sealing system of clause 12, Further comprising a sealing adaptor between the first support ring and the second support ring.

Clause 15. The sealing system of clause 14, further comprising at least one scaling v-ring.

Clause 16. A method of providing a fluid seal in a downhole environment, the method comprising: providing an annular seal in contact with a static surface; moving a dynamic surface radially opposite to the static surface in an axial direction relative to the annular seal; contacting the dynamic surface with a seal protrusion; and deforming an arm of the annular seal based at least partially on the contact of the seal protrusion with the dynamic surface, wherein deforming the arm of the annular seal reduces a support pressure of a support protrusion of the annular seal.

Clause 17. The method of clause 16, wherein a seal pressure of the seal protrusion is greater than the support pressure.

Clause 18. The method of clause 16, wherein the support pressure is reduced to zero.

Clause 19. The method of clause 16, further comprising axially centering the dynamic surface relative to the annular seal with the support protrusion.

Clause 20. The method of clause 16, further comprising scraping at least a portion of the dynamic surface with the support protrusion.

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive.

Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A seal comprising:
   a seal body;
   an inner arm protruding from the seal body and configured to mate with an inner surface, the inner arm including:
      an inner seal protrusion proximate to a distal end of the inner arm, and
      an inner support protrusion; and
   an outer arm protruding from the seal body and configured to mate with an outer surface, the outer arm including:
      an outer seal protrusion proximate to a distal end of the outer arm, and
      an outer support protrusion,
   wherein the inner seal protrusion and the outer seal protrusion define a seal width, and the inner support protrusion and the outer support protrusion define a support width less than the seal width in an uncompressed state, wherein at least one of the outer support protrusion or the inner support protrusion is non-continuous around a circumference of the seal with gaps between segments in a circumferential direction in a compressed state and in the uncompressed state and configured to allow fluid flow in an axial direction in the compressed state.

2. The seal of claim 1, further comprising a coating on at least one of the inner seal protrusion or outer seal protrusion.

3. The seal of claim 1, wherein at least one support protrusion includes a support material that is different from a seal material of at least one seal protrusion.

4. The seal of claim 1, wherein the outer seal protrusion includes a different material from the inner seal protrusion.

5. The seal of claim 1, wherein the outer support protrusion includes a different material from the outer seal protrusion.

6. The seal of claim 1, wherein at least one support protrusion includes a different material from the seal body.

7. The seal of claim 1, wherein at least one of the inner seal protrusion and outer seal protrusion includes a different material from the seal body.

8. The seal of claim 1, further comprising a second support protrusion distal to the outer seal protrusion on the outer arm.

9. The seal of claim 1, further comprising a second support protrusion distal to the inner seal protrusion on the inner arm.

10. The seal of claim 1, wherein at least one of the outer support protrusion or the inner support protrusion has a scraping edge proximate to the seal body.

11. A sealing system comprising:
a first seal including:
a seal body;
an inner arm protruding from the seal body and configured to mate with an inner surface, the inner arm including:
an inner seal protrusion proximate to a distal end of the inner arm, and
an inner support protrusion, and
an outer arm protruding from the seal body and configured to mate with an outer surface, the outer arm including:
an outer seal protrusion proximate to a distal end of the outer arm, and
an outer support protrusion,
wherein the inner seal protrusion and the outer seal protrusion define a seal width, and the inner support protrusion and outer support protrusion define a support with width;

a first support ring proximate to the first seal and configured to axially support the first seal;
a second seal positioned in an axial direction opposite the first seal and across the first support ring; and
a second support ring proximate to the second seal and configured to axially support the second seal between the second seal and the first support ring,
wherein at least one of the outer support protrusion or the inner support protrusion is non-continuous around a circumference of the seal with gaps between segments in a circumferential direction in a compressed state and in the uncompressed state and configured to allow fluid flow in an axial direction in the compressed state.

12. The sealing system of claim 11, wherein the first support ring includes an axial protrusion positioned between the inner arm and outer arm of the first seal.

13. The sealing system of claim 11, further comprising a sealing adaptor between the first support ring and the second support ring.

14. The sealing system of claim 13, further comprising at least one sealing v-ring.

15. A method of providing a fluid seal in a downhole environment, the method comprising:
providing an annular seal in contact with a static surface;
moving a dynamic surface radially opposite to the static surface in an axial direction relative to the annular seal;
contacting the dynamic surface with a seal protrusion; and
deforming an arm of the annular seal based at least partially on the contact of the seal protrusion with the dynamic surface, wherein deforming the arm of the annular seal reduces a support pressure of a support protrusion of the annular seal,
wherein the support protrusion is non-continuous around a circumference of the seal with gaps between segments in a circumferential direction in a compressed state and in the uncompressed state and configured to allow fluid flow in an axial direction in the compressed state.

16. The method of claim 15, wherein a seal pressure of the seal protrusion is greater than the support pressure.

17. The method of claim 15, wherein the support pressure is reduced to zero.

18. The method of claim 15, further comprising axially centering the dynamic surface relative to the annular seal with the support protrusion.

19. The method of claim 15, further comprising scraping at least a portion of the dynamic surface with the support protrusion.

* * * * *